Oct. 3, 1967 — G. B. BROOKOVER ET AL — 3,345,218
PREOXIDATION OF STAINLESS STEEL FOR GLASS-TO-METAL SEALING
Filed April 2, 1964

INVENTORS
GEORGE B. BROOKOVER
& CARL J. HUDECEK

ATTORNEYS

United States Patent Office 3,345,218
Patented Oct. 3, 1967

3,345,218
PREOXIDATION OF STAINLESS STEEL FOR GLASS-TO-METAL SEALING
George B. Brookover and Carl J. Hudecek, Toledo, Ohio, assignors to Owens-Illinois, Inc., a corporation of Ohio
Filed Apr. 2, 1964, Ser. No. 356,700
11 Claims. (Cl. 148—6.35)

This invention relates to stainless steel alloys having surfaces adapted to glass-to-metal sealing and, more specifically, to an improved process for preoxidizing the surfaces of certain stainless steel parts as a permanent measure to creating durable and vacuum-tight glass-to-metal seals, the preoxidized surfaces forming the bonding interface therebetween.

As known in the art, certain chromium-nickel-iron and chromium-iron alloys are particularly well suited, due to their specific thermal expansion coefficients, to sealing to a considerably wide range of glasses of similar expansion in the manufacture of certain electronic devices. Sealing stresses created in the composite body made by sealing a particular metallic part comprised of one of the aforementioned alloys such as an anode button into the envelope of an electron discharge device, for example, have been minimized by thermal expansion coefficients being properly matched or deviations therebetween being maintained within suitable limits.

In order to produce a strong uniform bond between the metal and the glass to which the metal part is sealed, without resort to an intermediate bonding material, it has been necessary to provide a relatively uniform stable layer of metallic oxide over the sealing surfaces of the alloy parts. The oxide layer preferably possesses properties of being both soluble in the glass at or near the sealing temperatures and firmly adherent to the base metal of the part such as when subjected to long-term service in an evacuated device.

An oxide layer can be produced on the surfaces of chromium-bearing alloy parts by their exposure to a stream of wet hydrogen while the parts are maintained at an elevated temperature. However, considerable difficulty has been experienced in obtaining the necessary adherence of the chromium-containing oxide film by a single oxidation cycle. This is particularly true in the case of certain alloys having questionable quality for the desired end use due to minor contaminants.

One process for preoxidizing chrome-iron and chrome-nickel-iron alloys for sealing to glass has been described in U.S. Patent No. 2,933,423 to Brookover and Tom, issued Apr. 19, 1960, entitled "Preoxidation of Stainless Steel for Glass-to-Metal Sealing." This patent describes a preoxidation process for forming a stable uniform oxide film over exposed surfaces of alloy parts by their exposure at an elevated temperature to a wet hydrogen atmosphere, the water vapor present being controllably regulated from an initial low to a subsequent high level to achieve optimum results. Also Patent No. 2,502,855 to Kingston, issued Apr. 4, 1950, describes a process for establishing a chromium oxide layer over alloy parts by subjecting the parts to a high velocity stream of wet hydrogen gas at a constant level of water content and at an elevated temperature of about 2300° F. However, in both of the aforementioned processes, objectionable formation of uncontrollably non-adherent oxide films of varying thickness frequently occurs over the surface of the preoxidized parts especially when the selected alloys contain contaminants such as minor amounts of silicon or manganese. Both of the aforementioned processes are dependent to some extent to uses of alloy parts fabricated of high-quality metal to achieve satisfactory results during preoxidation.

In the production of electron discharge devices such as cathode-ray picture tubes for television reception, it is essential that all glass-to-metal seals be as near perfectly vacuum-tight and mechanically durable as possible. In view of subjection of the parts to relatively high-speed sealing operations in producing glass funnels as one component part of a television picture tube envelope, a lead-in conductor element such as a hollow anode button comprised of chrome-nickel-iron containing alloy is normally sealed into the funnel sidewall with its interior and exterior surfaces exposed. Conductively-coated interior surfaces of the tube envelope connected to the anode button provide a low resistance path for the electrons to return to the power supply. Other parts which may be sealed into such tube envelope are mounting studs or lugs which are positioned within the glass in the skirt or flange portion of the tube face plate projecting interiorly for retaining an extensive color-controlling element such as a shadow mask or line grid in precise alignment with a luminescent screen on the interior surface of the tube viewing area.

In order to produce glass-to-metal seals which are leakproof and durable, it is important that the sealing surfaces of the metal alloy parts have oxidized surface layers which do not flake or peel away from the base metal during or after high-temperature fusion sealing. As can be appreciated, such flaking or separation from the base metal can be a direct cause of leakage and resultant tube failure due to separation of the parent metal surface and the oxide layer of the finished seal during fabrication or while in use. It has been found that by utilizing the subject oxidation process for treating metal alloy parts, which have been fabricated of the stated chromium-iron and chromium-nickel-iron alloys with or without certain contaminants, the parts can be expeditiously preoxidized with a firmly adherent oxide layer to facilitate their fusion welding to other tube elements such as glass parts wherein the metal part maintains its requisite conductivity and an exceedingly strong, highly-durable seal is formed.

Accordingly, it is an object of this invention to provide an improved method of preoxidizing sealing surfaces of stainless steel parts under controlled conditions of time, temperature and atmosphere, the oxidized parts being adapted to sealing to electronic glasses in vacuum-tight relation.

Another object of this invention is to provide an improved method of preoxidizing chrome-containing alloy parts under controlled conditions to provide a uniform adherent chromium-enriched oxide film over at least the sealing surfaces of the parts to permit their subsequent positive non-strippable sealing to glass in forming hermetic durable seals.

Another object of this invention is to provide a method of preoxidizing the sealing surfaces of chrome-iron and chrome-nickel-iron alloy parts to form a stable uniform oxide film having properties to permit the formation of improved structurally-superior glass-to-metal seals in fabricating electronic tube envelopes.

Another object of this invention is to provide a unique method of preoxidizing chromium steel parts as a preliminary step prior to their being sealed to glass in vacuum-tight relation wherein the oxide layer is exceedingly adherent and uniform and where the composition of the base metal has a wider range of permissable deviation from one melt to another, the parts being subjected to an oxidation, reduction and re-oxidation cycle to provide a chromium-enriched oxide film, the parts being subjected to a stream of wet hydrogen gas at an elevated temperature during the oxidation phases and to a stream of dry hydrogen gas at elevated temperature during the intermediate reduction phase.

A still further object of this invention is to provide a process for preoxidizing chrome-iron and chrome-nickel-iron alloy shaped parts as a preliminary step to their being effectively sealed to glass, the preoxidation establishing a stable uniform oxide film over at least the sealing surfaces of the parts by their subjection at an elevated temperature to a wet hydrogen atmosphere to oxidize the surfaces, an intermediate dry hydrogen atmosphere to reduce the oxide film, and a second wet hydrogen atmosphere to re-oxidize the chromium-enriched oxide film to achieve optimum expeditious results in preparing the parts for a wide range of sealing operations.

The specific nature of this invention, as well as other objects and advantages thereof, will become apparent to those skilled in the art from the following detailed description, taken in conjunction with the annexed sheet of drawings on which, by way of preferred example only, are illustrated the preferred embodiments of this invention.

While the present invention will be described in several preferred embodiments as especially suited for preoxidizing the surfaces of chrome-iron and chrome-nickel-iron alloy parts such as anode buttons or mounting studs for glass cathode-ray tube envelopes, it is fully understood that the principles of the invention are equally applicable to preoxidizing surfaces of other stainless steel parts intended for other purposes than those specifically described hereinbelow.

Figure 1:
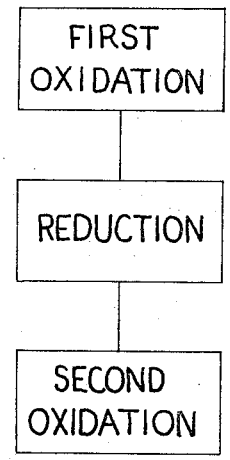
FIG. 1 is a diagrammatic view of the method of oxidation in accordance with the present invention.

Referring to FIG. 1 of the drawings, the present method broadly stated consists of subjecting the alloy parts to a first oxidation cycle, an intermediate reduction cycle and a second oxidation cycle, all conducted at an elevated temperature preferably with cooling of the parts intermediate each of the oxidizing and reducing cycles, the permit establishing different atmospheric conditions within the heated area of the furnace without adversely effecting development of the desired surface layer.

Figure 2:
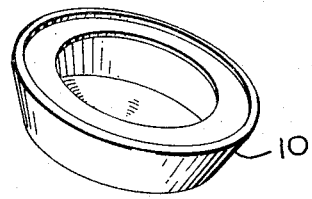
FIG. 2 is a perspective view of an anode button illustrative of alloy parts adapted to oxidation by the prescribed method.
Figure 3:
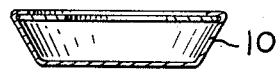
FIG. 3 is a vertical sectional view of said anode button.
Figure 4:
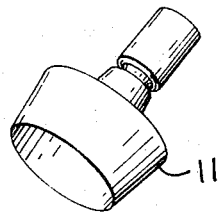
FIG. 4 is a perspective view of a mounting stud adapted to oxidation by the subject method.
Figure 5:
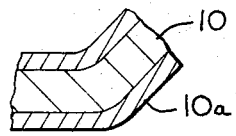
FIG. 5 is an enlarged fragmentary view of a button sidewall illustrating its finally-oxidized sealing surfaces.

FIGS. 2 and 3 illustrate an example of one part which may be preoxidized by the subject method such as a hollow frusto-conical shaped anode button 10. The button may be fabricated of an alloy such as chrome-nickel-iron, i.e., Sylvania No. 4 alloy or Philips "Nilo 475" alloy or chrome-iron alloys having a composition designated as stainless steel Nos. 430 and 446.

The metallic button 10 may have the shape of a hollow cup, its larger open end adapted to face exteriorly of the sidewall of a hollow glass part for engaging a connecting terminal. The button may be formed of a chrome-nickel-iron alloy such as the following Example A. The expansion coefficient of this particular type alloy is approximately $97-104 \times 10^{-7}$ centimeter per centimeter per degree C. through the range 20° to 430° C. Other alloys which are applicable to oxidation by the present method may consist of Nos. 430 and 446 stainless steel designated as Examples B and C. Analysis of example alloys are set forth below:

TABLE I

| | A | B | C |
|---|---|---|---|
| Percent: | | | |
| Ni | 42.0 | 0.50 | <0.50 |
| Cr | 5.6 | 27.0–29.0 | 28.0–30.0 |
| C | 0.07 | 0.12 | 0.12 |
| Mn | 0.25 | 0.50–0.80 | 0.50–0.70 |
| P | 0.025 | 0.03 | 0.03 |
| S | 0.025 | 0.03 | 0.03 |
| Si | 0.30 | 0.20–0.50 | 0.25–0.50 |
| Al | 0.20 | | |
| $N_2$ | | 0.10–0.15 | 0.13–0.18 |
| Fe | remainder | remainder | remainder |
| Coefficient of Thermal Expansion ($\times 10^{-7}$) (20°–430° C.) | 97–104 | 114 | 114 |

The above-described No. 4 and Nilo 475 alloys match the thermal expansion coefficient of the following glass particularly well for fusion-sealing thereto. An example of such glass is one containing 58.9% $SiO_2$, 10.3% PbO, 4.2% $Al_2O_3$, 5.8% CaO, 2.1% MgO, 1.2% BaO, 7.7% $Na_2O$ and 9.2% $Al_2O_3$ along with certain other constituents in lesser amounts which are utilized to control glass properties.

Figure 6:
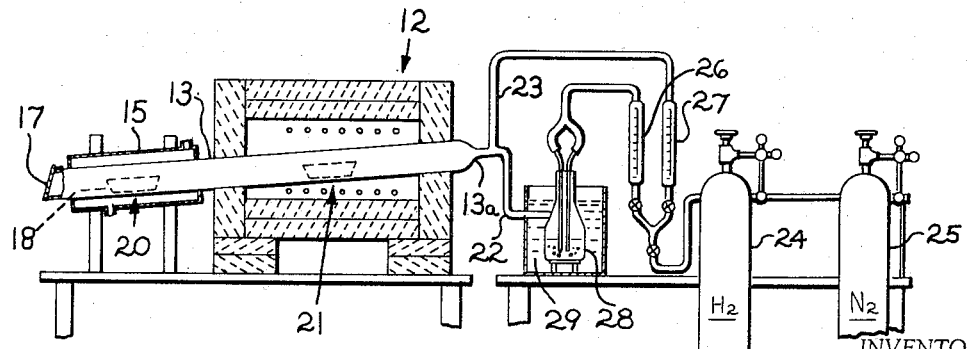
FIG. 6 is a view of the oxidizing apparatus.

Referring to FIG. 6 of the drawings, the oxidizing apparatus 12 is comprised of an elongated tube 13 mounted within a furnace 14 and an adjacent cooling chamber 15. The ends of tube 13 extend beyond the aligned furnace 14 and cooling chamber 15 to provide access into the tube and maintenance of a controlled atmosphere therein. Furnace 14 has a heating element 16 surrounding a lengthwise intermediate portion of the tube in spaced relation therefrom and may be fabricated essentially of refractory material. Chamber 15 has a fluid coolant such as water supplied to inlet and outlet lines connected thereto for maintaining minimal temperatures in this area of tube 13. Chamber 15 is adapted to facilitate introduction of the parts to be oxidized and cooling of same during latter stages of oxidation and reduction in a controlled manner. The tube end adjacent cooled chamber 15 is provided with a hinged access door 17. The tube portion surrounded by chamber 15 provides an area where the parts to be oxidized are flushed of their entrained air prior to oxidation and subsequently cooled after oxidation and reduction.

Metal trays 18 adapted to retain a plurality of anode buttons 10 or other alloy parts such as hollow studs 11 are adapted to be slid into the tube 13 into various positions such as designated by the numerals 20 and 21.

Tube end 13a is provided with several interconnecting lines 22 and 23 adapted to supply both wet and dry hydrogen gas to the reactant tube from tanks 24 and 25 of hydrogen and nitrogen respectively. The tank gas is normally passed through a drying and purification system. Hydrogen tank 24 and nitrogen tank 25 are each provided with a flow regulating valve and the gas is conducted through several flow meters 26 and 27 into tube end 13a. The gas stream passing through flow meter 26 is bubbled through a water receptacle 28 positioned within bath 29 maintained at a relatively constant temperature ranging from about 59° to 95° F. The gas saturated with the water vapor at the temperature of the bath is passed through line 22 into tube end 13a. The bath temperature may be varied between the aforesaid limits, an intermediate constant temperature of about 68° F. being preferred.

Each part to be sealed into glass is oxidized, de-oxidized and re-oxidized in a manner about to be described for forming a mechanically strong hermetic glass-to-metal seal. Areas of the alloy parts which are not employed to contact the glass in forming the seal may be freed of the oxide after the required glass-to-metal seal is effected such as where positive electrical contact with the part is required.

The method consists of the following procedure:

A dry nitrogen gas stream from tank 25 delivered through line 23 is employed to flush air from tube 13. This purging can normally be effected within a relatively short time. The inert gas is used to sweep the tube to prevent intermixing of hydrogen and oxygen. The chrome-iron or chrome-nickel-iron alloy parts such as anode buttons 10 or studs 11, for example, are placed within metal trays 18 which are then slid into tube 13 in the cooled zone 20 surrounded by chamber 15. The temperature within this area is maintained below about 250° F. and preferably about 175° F., the trays being retained there for about 5 to 20 minutes.

The parts are then moved into the hot zone 21 and subjected to a first oxidation cycle. An atmosphere of wet hydrogen gas is passed through tube 13 from right-to-left as shown in FIG. 6 to sweep the nitrogen from the tube. Hydrogen gas is delivered from tank 24 through water receptacle 28 and line 22. Metal trays 18 containing the parts are moved from left-to-right into hot zone 21 which is surrounded by furnace 14. The atmosphere consists of hydrogen gas containing a controlled amount of water vapor, the hydrogen being saturated with water vapor by bubbling through distilled water at a temperature ranging from about 59° to 95° F. (15° to 35° C.) and preferably about 68° F. (20° C.). The volume of wet hydrogen gas which is passed through tube 13 is dependent upon the tube volume, the number of parts being simultaneously oxidized and the water vapor content of the gas stream. The parts during this interval are preferably subjected to a stream of wet hydrogen gas, all of which has been saturated with water vapor at a temperature of about 59° to 95° F. for a period ranging from 30 to 350 minutes. The parts are maintained at a temperature ranging from about 2000° to 2400° F. during this phase; at a lower temperature for a longer time or at a higher temperature for a shorter time, time and temperature being complemental. The prescribed small quantity of water vapor combined with hydrogen produces a thin oxide coating that is firmly bonded to the metal. The use of increased water (higher bubbler temperature) accelerates the rate of chromium oxidation. During the initial oxidation, it has been observed that chromium migrates to the metal surface by a diffusion process during formation of the oxide surface layer which consists of 70 to 85% $Cr_2O_3$ for a chrome-nickel-iron alloy.

At the end of the first oxidation the metal trays are pulled into the cooling zone 20 of the furnace where they are cooled for about 5 to 20 minutes in the same wet hydrogen atmosphere to a temperature lower than about 250° F. It is preferred that the parts be cooled intermediate each of the oxidation, reduction and re-oxidation cycles to protect the nature of the film developed by each of the individual cycles during conversion of the atmosphere from oxidizing to reducing to re-oxidizing conditions. During cooling, the parts are protected from air to prevent uncontrolled oxidation.

The reduction or de-oxidation cycle is conducted by converting the atmosphere to a reducing condition and again moving the metal trays into the furnace area of the tube designated as zone 21. This zone is maintained at a temperature ranging from 2000° to 2400° F. for a period of approximately 30 to 350 minutes similar to first oxidation except for the atmosphere. During this interval, dry hydrogen having a dew point lower than 20° F. is employed, extremely dry hydrogen having a dew point below —40° F. being preferred. Dry hydrogen which is delivered through line 23 by passing the bubbler is employed. The drier the hydrogen, the faster the reduction, permitting lower temperatures to be used. This dry atmosphere is reducing in nature and a reduction of the surface oxides formed by the initial oxidation is effected. The surface layer is converted to a chromium-enriched metallic state which remains firmly bonded to the base metal. The layer of reduced metal contains more chromium than the original oxidized layer, and probably fewer impurities, since the latter may be "burned-off" due to being oxidized and de-oxidized. Also the re-oxidized layer appears to contain more chromium oxide than the original or first oxidized layer as evidenced by its improved adherence.

At the end of the reduction cycle, the metal trays are moved into cooling zone 20 where they are again cooled for about 5 to 20 minutes in the dry hydrogen atmosphere to a temperature lower than 250° F. During a latter part of this cooling interval, the atmosphere is again changed internally of tube 13 to pass a stream of wet hydrogen gas saturated with water vapor therethrough. The parts are again moved into hot zone 21 and subjected to a temperature ranging from about 2000° to 2400° F. for a period ranging from 30 to 350 minutes to convert the chromium-enriched metallic surface to oxide film. Following this re-oxidation period, the parts are again moved into cooling zone 20 and allowed to cool to a temperature lower than 250° F. while being subjected to the wet hydrogen gas stream. Nitrogen is again passed through the tube 13 after removing the trays containing the parts from the furnace. Such sweeping of the tube of hydrogen prevents mixing of hydrogen and oxygen within the heated area of the tube.

The final oxide film which is developed ranges from 1.2 to 3.0 milligrams of oxygen per square inch of metal surface calculated on weight-loss basis. The tightly-adherent oxide film which is developed must be sufficiently heavy to permit its at least partial solublizing in molten glass during the formation of a glass-to-metal seal. If the film is not sufficiently heavy to protect the base metal during fusion sealing, the base metal can be over-heated to form defective seals.

A test sample of the finally-oxidized parts is subjected to sealing tests which consist of joining the frusto-conical surfaces of button 10 to a short length of glass tubing having essentially the same diameter, for example, the tests being conducted within the temperature range of 2000° to 2400° F. The seals are created by fusion sealing of the parts by heating to 2400° F., for example, for a period of 20 seconds in so-called stripability tests. The seals are rejectable if it is found that the glass-to-metal seal strips across the seal area at any point upon breaking the glass away. Normally the tests are conducted at 100° F. intervals between 2000° and 2400° F. to determine seal quality, and only parts capable of being sealed to electronic glasses at temperatures of 2300° and 2400° F. are considered acceptable.

The subject method is of particular utility in evaluating preoxidized metal alloy parts such as those found to exhibit a poor oxide quality after a single oxidation cycle as taught by the prior art. In the case such defectively-oxidized metal, by following the proper oxidation, de-oxidation and re-oxidation cycles, it has been found that seal quality can be improved to permit such parts to be sealed to glass in the temperature range of from 2300° to 2400° F. without difficulty.

It has been found that when a preferred oxidation, de-oxidation and re-oxidation process works well for one particular melt of a given stainless steel chromium-containing alloy, it is generally capable of providing satisfactory results in preoxidizing parts made of other melts of essentially the same alloy. The inherent variations from melt to melt are capable of being overcome to a considerable degree by the present process.

In a preferred embodiment of this invention where chrome-nickel-iron alloy parts such as Sylvania No. 4 and "Nilo" No. 475 alloy parts are preoxidized, the initial oxidation cycle is conducted at a temperature of approximately 2400° F. for 30 minutes, the reduction cycle at about 2400° F. for about 30 minutes, and the re-oxidation cycle at a temperature of about 2200° F. for about 60 minutes with intermediate periods of cooling during atmosphere conversion. This procedure produces a final oxide film which is optimum for the aforementioned alloys for glass sealing. Also it has been found that by following the prescribed procedure upgrading of alloy parts to permit their being sealed at temperatures anywhere from 200° to 300° F. higher than known pre-oxidizing processes is fully capable of attainment.

It has been observed that the final oxidation temperature is important and that a temperature of about 2200° F. is definitely preferred. Neither initial oxidation nor reduction temperatures appear to correlate with final oxide quality. With regard to the second oxidation utilizing a temperature as high as 2400° F. does not produce as good a result as a temperature of about 2200° with regard to oxide quality.

It has been found that metal parts having initially high oxide quality after first oxidation are not generally benefitted by further processing, but those of medium or low oxide quality are benefitted greatly. The subject process appears to be more universal, being applicable to any melt of metal of the outlined types thus far tested.

The apparatus employed to practice the present invention may alternately comprise a tubular put-through type furnace with doors at opposite ends or other modifications to provide equipment having additional advantages for commercial production. The water or oxygen content of the oxidizing atmosphere during both the primary and secondary oxidizing cycles is an important factor in the type and character of oxide produced. The nitrogen gas may be utilized as desired to regulate the rate of oxidation or reduction by its addition to the gas stream serving to dilute the amount of effective reactants in the stream.

As stated supra, one of the distinct advantages of the prescribed method or preoxidizing chrome-containing alloy parts is that a much improved oxide coating is obtainable over the surfaces of parts which are fabricated of alloys containing minor amounts of contaminants or varying in composition from melt to melt, which variations are highly deterimental to forming duplicatable oxide films for glass-to-metal sealing. The final seals as indicated by stripability tests have indicated much improved characteristics over those previously formed by known preoxidizing methods. Analyses for the oxide film indicate a highly-enriched chromium oxide content which, due to the glass forming characteristics of chromium oxide, is in the direction of increasing the solubility of the oxide layer in parent or base glass.

While the elevated temperatures necessary to achieve the desired oxidation, de-oxidation and re-oxidation to form the desired oxide film may be varied by as much as 100° to 200° F. from the preferred range of 2000° to 2400° F., it has been found that at least some degradation of the final oxide occurs which results in undesirable sealing properties of the oxidized parts as evidenced by stripability tests.

Various modifications may be resorted to within the spirit and scope of the appended claims.

We claim:
1. The method of preoxidizing the surface of chrome-iron and chrome-nickel-iron alloy parts to facilitate their vacuum-tight sealing to glass comprising the steps of
   subjecting the parts to a first oxidation cycle to form an oxide layer having an enriched chromium oxide content,
   subjecting the oxidized parts to a reduction cycle to reduce the oxides of the chromium-enriched surface layer to the metallic state,
   and subjecting the said reduced surface layer to a second oxidation cycle to convert the chromium-enriched surface layer to a firmly-bonded adherent oxide film adapted to glass sealing.

2. The method as defined in claim 1, including the step of
   subjecting the initially-oxidized parts to a reduction cycle comprising exposure to a dry hydrogen atmosphere at an elevated temperature.

3. The method as defined in claim 1, including the step of
   employing similar first and second oxidation cycles to increase the chromium oxide content of the oxide layer comprising exposure to a wet hydrogen atmosphere at an elevated temperature.

4. The method as defined in claim 1, including the step of
   exposing said parts during the first and second oxidation cycles to a gaseous stream of wet hydrogen for approximately 30 to 350 minutes at a temperature ranging from about 2400° to 2000° F., the gaseous stream comprising hydrogen saturated with water vapor at a temperature from about 59° to 95° F.

5. The method as defined in claim 1, including the step of
   exposing said parts during the reduction cycle to a gaseous stream of dry hydrogen for approximately 30 to 350 minutes at a temperature ranging from about 2400° to 2000° F., the gaseous stream comprising dry hydrogen having a dew point lower than 20° F.

6. The method of preoxidizing at least the sealing surfaces of chrome-iron and chrome-nickel-iron alloy parts prior to sealing said parts to glass comprising the steps of
   exposing the parts during a first oxidation cycle to a gaseous stream of wet hydrogen for approximately 30 to 350 minutes at a temperature ranging from about 2400° to 2000° F., the gaseous stream comprising hydrogen saturated with water vapor at a temperature from about 59° to 95° F.,
   exposing the parts during a reduction cycle to a gaseous stream of dry hydrogen for approximately 30 to 350 minutes at a temperature ranging from about 2400° to 2000° F., the gaseous stream comprising dry hydrogen having a dew point lower than 20° F.,
   and again exposing the parts during a second oxidation cycle to a gaseous stream of wet hydrogen similar to the conditions of the first oxidation cycle.

7. The method as defined in claim 6, including the step of
   cooling said parts to near ambient temperature intermediate each of said first oxidation, reduction and second oxidation cycles.

8. The method as defined in claim 6, including the step of
   heating and cooling said parts in the same atmosphere in which treated during the said oxidation, reduction and re-oxidation cycles.

9. The method as defined in claim 6, including the steps of
   subjecting a plurality of said parts to exposure to the oxidation, reduction and re-oxidation cycles,
   and developing an oxide layer over at least the sealing surfaces of said parts ranging from 1.2 to 3.0 milligrams of oxygen per square inch of area.

10. The method of preoxidizing sealing surfaces of chrome-iron and chome-nickel-iron alloy parts prior to sealing said parts to glass comprising the steps of
    subjecting the parts to a first oxidation cycle by exposure to a gaseous stream of wet hydrogen for approximtaely 30 minutes at a temperature of about 2400° F., the gaseous stream comprising hydrogen saturated with water vapor at approximately a temperature from about 59° to 95° F.,
    subjecting the parts to a reduction cycle by exposure to a gaseous stream of dry hydrogen for approximately 30 minutes at a temperature of about 2400° F., the gaseous stream comprising dry hydrogen having a dew point lower than 20° F.,
    and subjecting the parts to a second oxidation cycle by exposure to a gaseous stream of wet hydrogen for approximately 60 minutes at a temperature of about 2200° F., said hydrogen being saturated with water vapor at a temperature from about 59° to 95° F., thereby forming an adherent oxide layer ranging from 1.2 to 3.0 milligrams of oxygen per square inch of area.

11. A metallic part adapted to glass sealing comprising a chromium-containing alloy such as chrome-iron or chrome-nickel-iron, for example,
- a firmly-bonded chromium-enriched adherent oxide layer on the sealing surfaces of said part,
- said oxide layer ranging from 1.2 to 3.0 milligrams of oxygen per square inch of area,
- said adherent layer formed by a combined oxidation, reduction and re-oxidation process,
- each phase of said process being conducted at an elevated temperature ranging from about 2400° to 2000° F. for a period of from about 30 to 350 minutes using a wet hydrogen atmosphere for the oxidation steps and a dry hydrogen atmosphere for the intermediate reduction step.

References Cited
UNITED STATES PATENTS

| | | | |
|---|---|---|---|
| 2,442,223 | 5/1948 | Uhlig | 148—6.35 |
| 2,502,855 | 4/1950 | Kingston | 148—6.35 |
| 2,933,423 | 4/1960 | Brookover et al. | 148—6.35 |
| 3,259,526 | 7/1966 | Walker et al. | 148—6.35 |

ALFRED L. LEAVITT, *Primary Examiner.*

R. S. KENDALL, *Examiner.*